United States Patent
Kell et al.

(10) Patent No.: US 10,074,859 B2
(45) Date of Patent: Sep. 11, 2018

(54) SYSTEMS AND METHODS FOR SHUNT CURRENT AND MECHANICAL LOSS MITIGATION IN ELECTROCHEMICAL SYSTEMS

(71) Applicant: UniEnergy Technologies, LLC, Mukilteo, WA (US)

(72) Inventors: Bradley Kell, Pembroke, MA (US); Jon Horner, Everett, WA (US); Rick Winter, Orinda, CA (US)

(73) Assignee: UniEnergy Technologies, LLC, Mukilteo, WA (US)

( * ) Notice: Subject to any disclaimer, the term of this patent is extended or adjusted under 35 U.S.C. 154(b) by 235 days.

(21) Appl. No.: 14/217,077

(22) Filed: Mar. 17, 2014

(65) Prior Publication Data

US 2014/0287335 A1    Sep. 25, 2014

Related U.S. Application Data

(60) Provisional application No. 61/800,061, filed on Mar. 15, 2013.

(51) Int. Cl.
| | |
|---|---|
| *H01M 8/02* | (2016.01) |
| *H01M 8/0276* | (2016.01) |
| *H01M 8/2455* | (2016.01) |
| *H01M 8/18* | (2006.01) |
| *H01M 8/0273* | (2016.01) |
| *H01M 8/241* | (2016.01) |
| *H01M 8/2484* | (2016.01) |
| *H01M 8/04276* | (2016.01) |

(Continued)

(52) U.S. Cl.
CPC ....... *H01M 8/0278* (2013.01); *F16L 37/1225* (2013.01); *H01M 8/0273* (2013.01); *H01M 8/04276* (2013.01); *H01M 8/188* (2013.01); *H01M 8/20* (2013.01); *H01M 8/241* (2013.01); *H01M 8/2455* (2013.01); *H01M 8/2484* (2016.02); *Y02E 60/528* (2013.01)

(58) Field of Classification Search
None
See application file for complete search history.

(56) References Cited

U.S. PATENT DOCUMENTS

| 4,852,917 A | 8/1989 | Viall, Jr. |
|---|---|---|
| 5,496,076 A | 3/1996 | Lin |
| (Continued) | | |

OTHER PUBLICATIONS

International Search Report and Written Opinion dated Aug. 14, 2014, issued in corresponding International Application No. PCT/US2014/030677, filed Mar. 17, 2014, 18 pages.

(Continued)

*Primary Examiner* — Barbara Lee Gilliam
*Assistant Examiner* — Wyatt P McConnell
(74) *Attorney, Agent, or Firm* — Christensen O'Connor Johnson Kindness PLLC (57) ABSTRACT

Systems and methods for shunt current and mechanical loss mitigation in electrochemical systems include a conduit providing at least a portion of an electrically conductive pathway between the first and second electrochemical cells, wherein the conduit includes at least one shunt current suppression device configured as a loop, and/or a connector assembly for maintaining first and second connecting portions in adjacent positioning.

20 Claims, 9 Drawing Sheets

(51) Int. Cl.
*F16L 37/12* (2006.01)
*H01M 8/20* (2006.01)

(56) References Cited

U.S. PATENT DOCUMENTS

| | | | |
|---|---|---|---|
| 6,509,119 B1 * | 1/2003 | Kobayashi | C01B 31/04 |
| | | | 423/445 R |
| 6,524,452 B1 * | 2/2003 | Clark | C25B 15/08 |
| | | | 204/254 |
| 2009/0047570 A1 | 2/2009 | Harper | |
| 2013/0029196 A1 | 1/2013 | Perry | |

OTHER PUBLICATIONS

Tokuda, N., et al., "Development of a Redox Flow Battery System," SEI Technical Review 50:88-94, Jun. 2000.
International Preliminary Report on Patentability and Written Opinion dated Sep. 15, 2015, issued in corresponding International Application No. PCT/US2014/030677, filed Mar. 17, 2014, 15 pages.

* cited by examiner

SYSTEMS AND METHODS FOR SHUNT CURRENT AND MECHANICAL LOSS MITIGATION IN ELECTROCHEMICAL SYSTEMS

CROSS-REFERENCE TO RELATED APPLICATION

This application claims the benefit of U.S. Provisional Application No. 61/800,061, filed on Mar. 15, 2013, the disclosure of which is expressly incorporated by reference herein in its entirety.

BACKGROUND

Concerns over the environmental consequences of burning fossil fuels have led to an increasing use of renewable energy generated from sources such as solar and wind. The intermittent and varied nature of such renewable energy sources, however, has made it difficult to fully integrate these energy sources into electrical power grids and distribution networks. A solution to this problem has been to employ large-scale electrical energy storage (EES) systems, which systems are widely considered to be an effective approach to improve the reliability, power quality, and economy of renewable energy derived from solar or wind sources.

Among the most promising large-scale EES technologies are redox flow batteries (RFBs). RFBs are special electrochemical systems that can repeatedly store and convert megawatt-hours (MWhs) of electrical energy to chemical energy and chemical energy back to electrical energy when needed.

In simplified terms, an electrochemical cell is a device capable of either deriving electrical energy from chemical reactions, or facilitating chemical reactions through the introduction of electrical energy. In general, an electrochemical cell includes two half-cells, each having an electrolyte. The two half-cells may use the same electrolyte, or they may use different electrolytes. With the introduction of electrical energy, species from one half-cell lose electrons (oxidation) to their electrode while species from the other half-cell gain electrons (reduction) from their electrode. Multiple electrochemical cells electrically connected together in series within a common housing are generally referred to as an electrochemical "stack".

A redox (reduction/oxidation) flow battery (RFB) is a special type of electrochemical system in which electrolyte containing one or more dissolved electro-active species flows through electrochemical cells. A common RFB electrochemical cell configuration includes two opposing electrodes separated by an ion exchange membrane or other separator, and two circulating electrolyte solutions, referred to as the "anolyte" and "catholyte". The energy conversion between electrical energy and chemical potential occurs instantly at the electrodes when the liquid electrolyte begins to flow through the cells.

One problem associated with RFBs is the creation and existence of shunt currents in and between electrochemical stacks during operation. Because of the conductivity of the liquid electrolytes and a non-zero electrical field potential gradient, shunt currents can flow between individual cells and cell stacks by traveling through pathways of conductive liquid electrolytes. The presence of shunt currents can reduce each stack's overall electrical storage and discharge capacity and decrease the energy efficiency of the overall system. Thus, it is desirable to reduce and/or eliminate shunt current losses within flow electrochemical energy systems while also minimizing mechanical pumping losses in those systems.

Accordingly, there is a need for new and improved flowing electrolyte electrochemical energy systems and related methods for fluid flow. The present disclosure fulfills these needs and provides for further related advantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a redox flow battery system is provided. The system generally includes an anolyte storage tank for containing a liquid anolyte; a catholyte storage tank for containing a liquid catholyte; at least first and second electrochemical cells; a conduit providing at least a portion of an electrically conductive pathway between the first and second electrochemical cells, wherein the conduit includes at least one shunt current suppression device configured as a loop.

In accordance with another embodiment of the present disclosure, a redox flow battery system is provided. The system generally includes an anolyte storage tank for containing a liquid anolyte; a catholyte storage tank for containing a liquid catholyte; at least first and second electrochemical stacks; a conduit providing at least a portion of an electrically conductive pathway between the first and second electrochemical cells, wherein the conduit includes at least one shunt current suppression device configured in a looping pattern and wherein the shunt current loss reduction is greater than the increased mechanical losses imparted by the shunt current suppression device.

In accordance with another embodiment of the present disclosure, a redox flow battery system is provided. The system generally includes at least one electrochemical cell; at least one conduit configured to extend from the at least one electrochemical cell; and at least one connector assembly for connecting the conduit and the at least one electrochemical cell, wherein the at least one connector assembly includes a first portion of the connector assembly, a second portion of the connector assembly, and a retaining mechanism for maintaining the first and second portions in adjacent positioning.

In accordance with another embodiment of the present disclosure, a connector assembly for a redox flow battery system having at least one electrochemical cell and a conduit extending from the electrochemical cell is provided. The connector assembly generally includes a first portion connectable to the conduit; a second portion connectable to the electrochemical cell; and a retaining mechanism for maintaining the first and second portions in adjacent positioning.

In accordance with another embodiment of the present disclosure, a connector assembly is provided. The connector assembly generally includes a first portion connectable by welding to a first conduit, the first connection portion including a first flange and an extension portion including at least one O ring seal; a second portion connectable by welding to a second conduit, the second portion including a second flange and a receiving portion including at least one groove in the receiving portion for receiving the extension portion and the O-ring seal; and a retaining mechanism for maintaining the first and second flanges in adjacent positioning.

In accordance with any of the embodiments described herein, the shunt current suppression device may include first and second connections.

In accordance with any of the embodiments described herein, the shunt current suppression device may be continuous tubing extending between first and second connections.

In accordance with any of the embodiments described herein, the shunt current suppression device may not include elbow fittings.

In accordance with any of the embodiments described herein, the shunt current suppression device may be made from a flexible material, a rigid material, or a semi-rigid material.

In accordance with any of the embodiments described herein, the shunt current suppression device may be made from a flexible material, which is then is annealed to impart some rigidity during the forming process.

In accordance with any of the embodiments described herein, the flexible material may be selected from the group consisting of cross-linked polyethylene (PEX), high density polyethylene (HDPE), polypropylene (PP), polytetrafluoroethylene (PTFE), polyvinylchloride (PVC), and polyvinylidene fluoride (PVDF).

In accordance with any of the embodiments described herein, the loop may include at least one full turn.

In accordance with any of the embodiments described herein, the loop may have a radius of curvature at any point along the length of the loop.

In accordance with any of the embodiments described herein, the loop may be configured in a substantially circular shape, substantially oval shape, substantially rectangular shape, substantially rectangular shape with rounded ends, or a substantially elliptical shape.

In accordance with any of the embodiments described herein, the first and second electrochemical cells may be stacks of multiple electrochemical cells.

In accordance with any of the embodiments described herein, the first and second electrochemical cells may be individual electrochemical cells.

In accordance with any of the embodiments described herein, the system may include at least a third electrochemical cell.

In accordance with any of the embodiments described herein, the conduit providing an electrically conductive pathway between the first and second electrochemical cells may be a common manifold between the first and second electrochemical cells.

In accordance with any of the embodiments described herein, the conduit providing an electrically conductive pathway between the first and second electrochemical cells may be a common manifold for one of catholyte inlets, catholyte outlets, anolyte inlets, and anolyte outlets.

In accordance with any of the embodiments described herein, the system may further include a shunt current suppression device for each of the catholyte inlets, catholyte outlets, anolyte inlets, and anolyte outlets.

In accordance with any of the embodiments described herein, the system may further include a support assembly for supporting the conduit.

In accordance with any of the embodiments described herein, the support assembly may include a support frame.

In accordance with any of the embodiments described herein, the support assembly may include a cover configured to support the conduit.

In accordance with any of the embodiments described herein, the support assembly may be configured to support the flexible tubing in a substantially continuously sloped configuration to allow for downward fluid flow.

In accordance with any of the embodiments described herein, the shunt current loss reduction may be greater than the increased mechanical loss imparted by the shunt current suppression device.

In accordance with any of the embodiments described herein, the system may further include at least one connector assembly for connecting the conduit in the system.

In accordance with any of the embodiments described herein, the system may further include first and second connector assemblies for connecting the conduit in the system.

In accordance with any of the embodiments described herein, the at least one connector assembly may include a first portion connectable to the conduit, a second portion connectable to the electrochemical cell, and a retaining mechanism for maintaining the first and second portions in adjacent positioning.

In accordance with any of the embodiments described herein, the first portion may include a first flange and the second portion may include a second flange.

In accordance with any of the embodiments described herein, the connector assembly may include a seal between the first and second portions.

In accordance with any of the embodiments described herein, the fluid flow path may be a substantially straight fluid path through the connector assembly.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
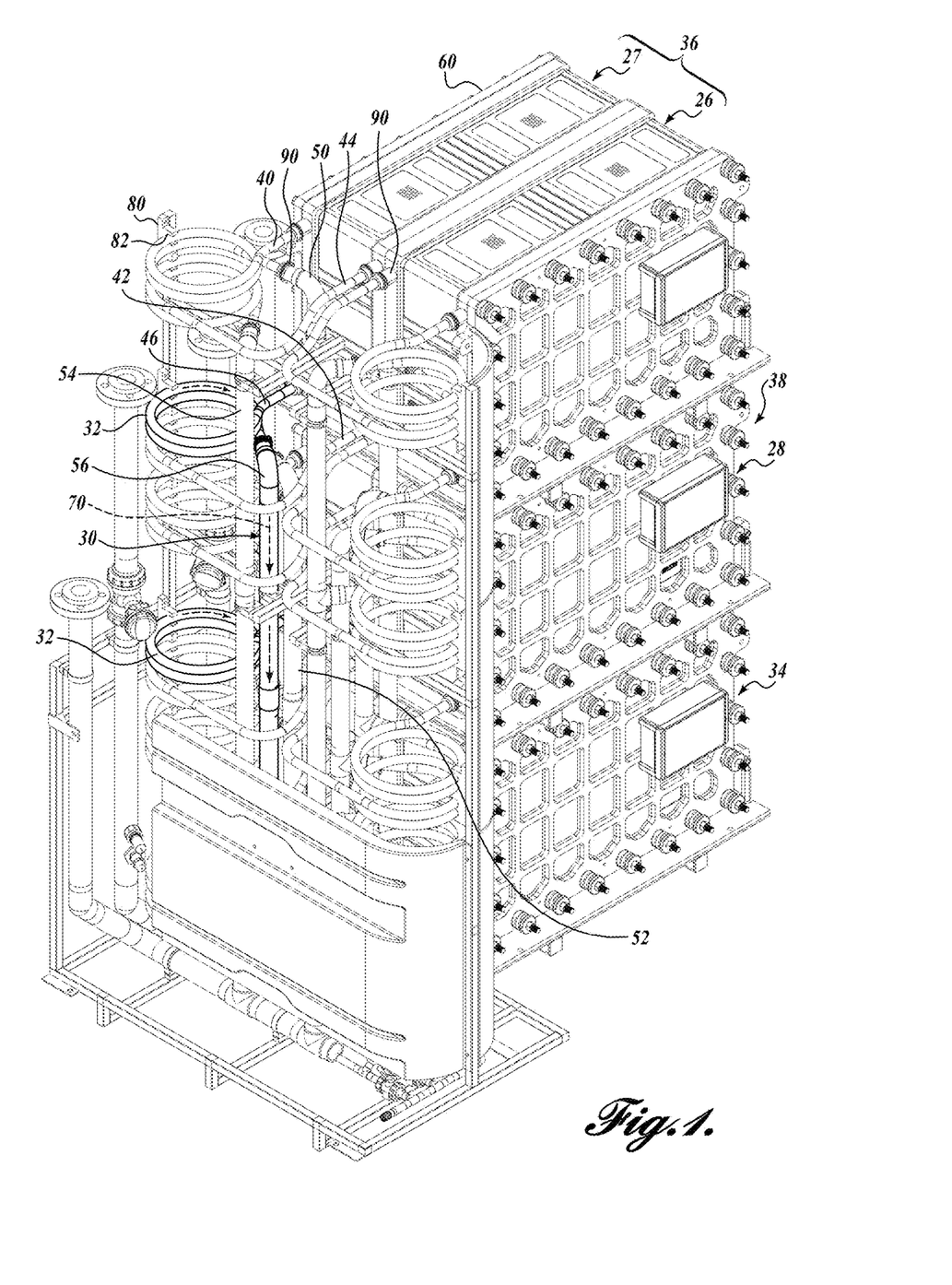
FIG. 1 is a front perspective view of a flowing electrolyte electrochemical energy system in accordance with one embodiment of the present disclosure.
Figure 2:
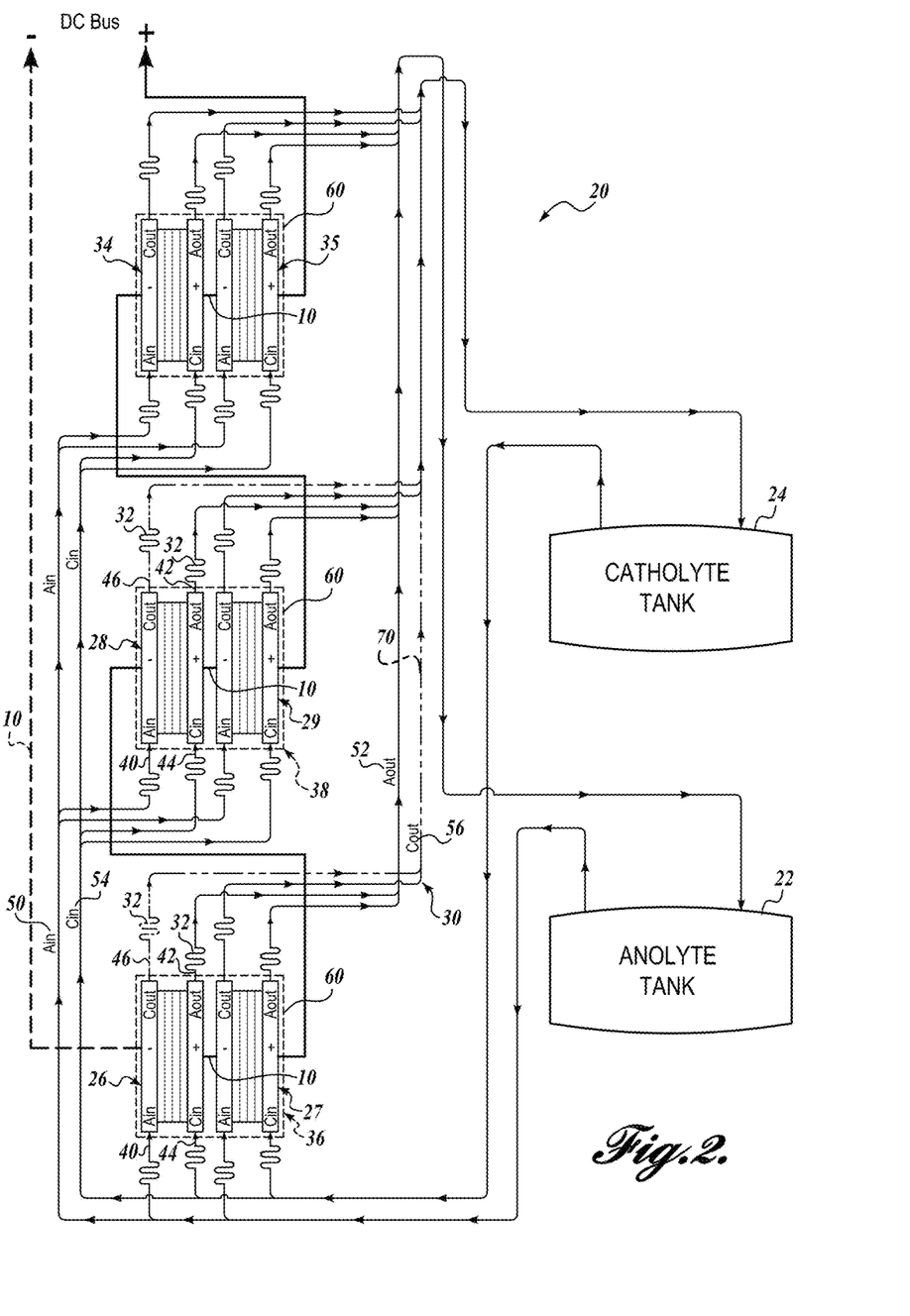
FIG. 2 is a schematic view of the system of FIG. 1.
Figure 3:
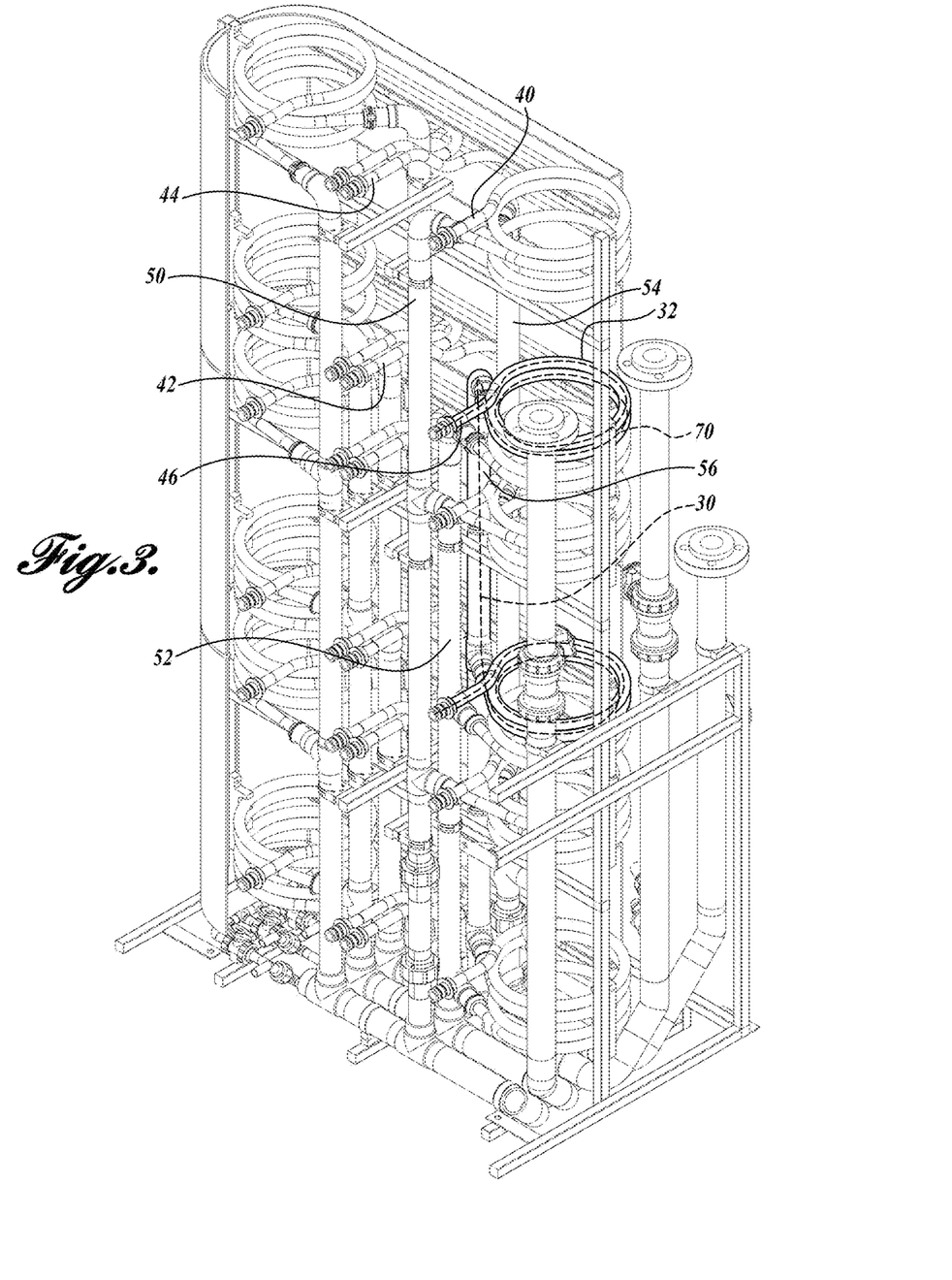
FIG. 3 is a rear perspective view of the shunt current suppression assembly in the flowing electrolyte electrochemical system of FIG. 1.
Figure 4:
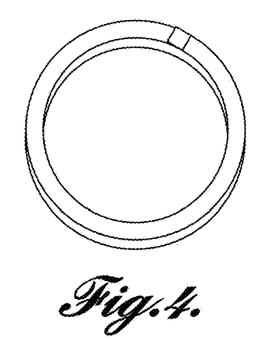
FIGS. 4-11 are top and perspective view of various embodiments of shunt current suppression devices for use in the flowing electrolyte electrochemical system of FIG. 1 or in accordance with other embodiments of the present disclosure.
Figure 5:
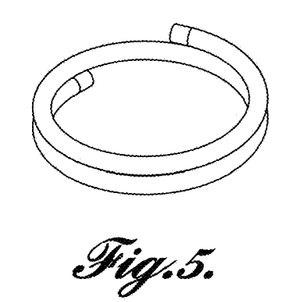
Figure 6:
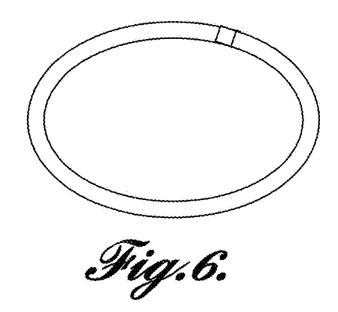
Figure 7:
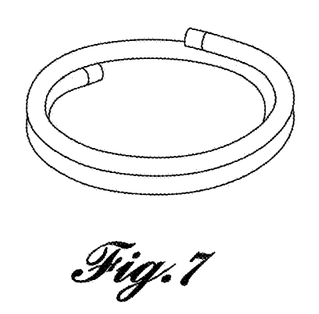
Figure 8:
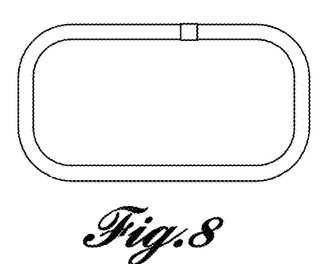
Figure 9:
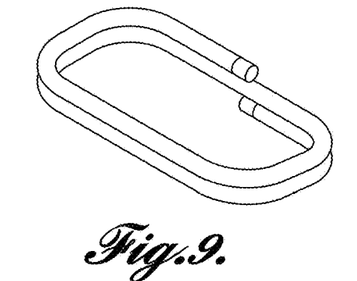

Embodiments of the present disclosure are directed to shunt current suppression systems and assemblies for electrochemical systems and methods for achieving shunt current suppression while minimizing mechanical pumping losses within the system. Referring to FIGS. 1-3, a redox flow battery system 20 designed in accordance with one embodiment of the present disclosure is illustrated. The system 20 includes an anolyte storage tank 22 for containing a liquid anolyte and a catholyte storage tank 24 for containing a liquid catholyte (see FIG. 2, storage tanks 22 and 24 are not included in FIG. 1). The system 20 further includes at least first and second electrochemical cells 26 and 28, a source of electrical current flowing through the system 20, as indicated by line 10, and at least one electrically conductive pathway created by at least one fluid conduit 30 between the first and second electrochemical cells (see FIGS. 1 and 2). As described in greater detail below, at least one shunt current suppression device 32 is positioned along at least a portion of the electrically conductive pathway 30.

In some embodiments of the present disclosure, the flow electrochemical energy systems are described in the context of a vanadium redox flow battery (VRFB), wherein a $V^{3+}/V^{2+}$ sulfate solution serves as the negative electrolyte ("anolyte") and a $V^{5+}/V^{4+}$ sulfate solution serves as the positive electrolyte ("catholyte"). It is to be understood, however, that other redox chemistries are contemplated and within the scope of the present disclosure, including, as non-limiting examples, $V^{2+}/V^{3+}$ vs. $Br^-/ClBr_2$, $Br_2/Br^-$ vs. $S/S^{2-}$, $Br^-/Br_2$ vs. $Zn^{2+}/Zn$, $Ce^{4+}/Ce^{3+}$ vs. $V^{2+}/V^{3+}$, $Fe^{3+}/Fe^{2+}$ vs. $Br_2/Br^-$, $Mn^{2+}/Mn^{3+}$ vs. $Br_2/Br^-$, $Fe^{3+}/Fe^{2+}$ vs. $Ti^{2+}/Ti^{4+}$, etc.

Although shown and described with reference to a redox flow battery system 20, it should be appreciated that the shunt current suppression devices described herein are not limited to those used in RFBs. The shunt current suppression devices can be used in any system having a plurality of electrochemical cells and that would benefit from shunt current suppression, such as fuel cells.

Referring to the schematic in FIG. 2, general operation of the redox flow battery system 20 will be described. The redox flow battery system 20 operates by circulating the anolyte and the catholyte from respective tanks 22 and 24 into the electrochemical cells 26 and 28. The cells 26 and 28 operate to discharge or store energy as directed by power and control elements in electrical communication with the electrochemical cells 26 and 28. In one mode (sometimes referred to as the "charging" mode), power and control elements, connected to a power source, operate to store electrical energy as chemical potential in the catholyte and anolyte. The power source can be any power source known to generate electrical power, including renewable power sources, such as wind, solar, and hydroelectric. Traditional power sources, such as combustion, can also be used.

In a second ("discharge") mode of operation, the redox flow battery system 20 is operated to transform chemical potential stored in the catholyte and anolyte into electrical energy that is then discharged on demand by power and control elements that supply an electrical load.

Each electrochemical cell in the system 20 includes a positive electrode, a negative electrode, at least one catholyte channel, at least one anolyte channel, and an ion transfer membrane separating the catholyte channel and the anolyte channel. The ion transfer membrane separates the electrochemical cell into a positive side and a negative side. Selected ions (e.g., H+) are allowed to transport across the ion transfer membrane as part of the electrochemical charge and discharge process. The positive and negative electrodes are configured to cause electrons to flow along an axis normal to the ion transfer membrane during electrochemical cell charge and discharge (see, e.g., line 10 shown in FIGS. 12 and 13). As can be seen in FIG. 2, fluid inlets 40 and 44 and outlets 42 and 46 are configured to allow integration of the electrochemical cells 26 and 28 into the redox flow battery system 20.

To obtain high voltage/power systems, a plurality of single electrochemical cells may be assembled together in series to form a stack of electrochemical cells (referred to herein as a "stack," a "cell stack," or an "electrochemical cell stack"). Several cell stacks may then be further assembled together to form a battery system. A MW-level RFB system can be created and generally has a plurality of cell stacks, for example, with each cell stack having more than twenty electrochemical cells. As described for individual electrochemical cells, the stack is also arranged with positive and negative current collectors that cause electrons to flow through the cell stack along an axis normal to the ion transfer membranes and current collectors during electrochemical charge and discharge (see, e.g., line 10 shown in FIGS. 12 and 13).

A shunt is a device that allows electric current to pass around another point in a circuit by creating a low resistance path. Shunt currents in a redox flow battery flow though ionically conductive fluid paths that pass around the desired cell stack electron flow path described above, thus reducing system efficiency. To reduce shunt currents, it is desirable to increase electrical resistance in selected fluid pathways where shunt currents may be present.

In designing shunt current suppression devices in accordance with embodiments of the present disclosure, it is also desirable to minimize mechanical flow resistance in these same fluid pathways. For any fluid flow rate, mechanical resistance can be added to the system by, for example, reducing the diameter of the conduit, increasing the length of the conduit, changing the material and roughness of the conduit, adding any connecting weld, or adding fittings such as connectors or elbows in the conduit, etc. Added mechanical flow resistance in fluid pathways adds mechanical work that the system must perform to operate, for example, by requiring additional pumping power for electrolyte flow. Mechanical work added to the system by shunt current suppression devices may offset added system efficiency produced by mitigating shunt currents. Therefore, in some embodiments of the present disclosure, designs for mitigating shunt currents increase electrical resistance in fluid pathways while minimizing mechanical flow resistance.

Figure 15:
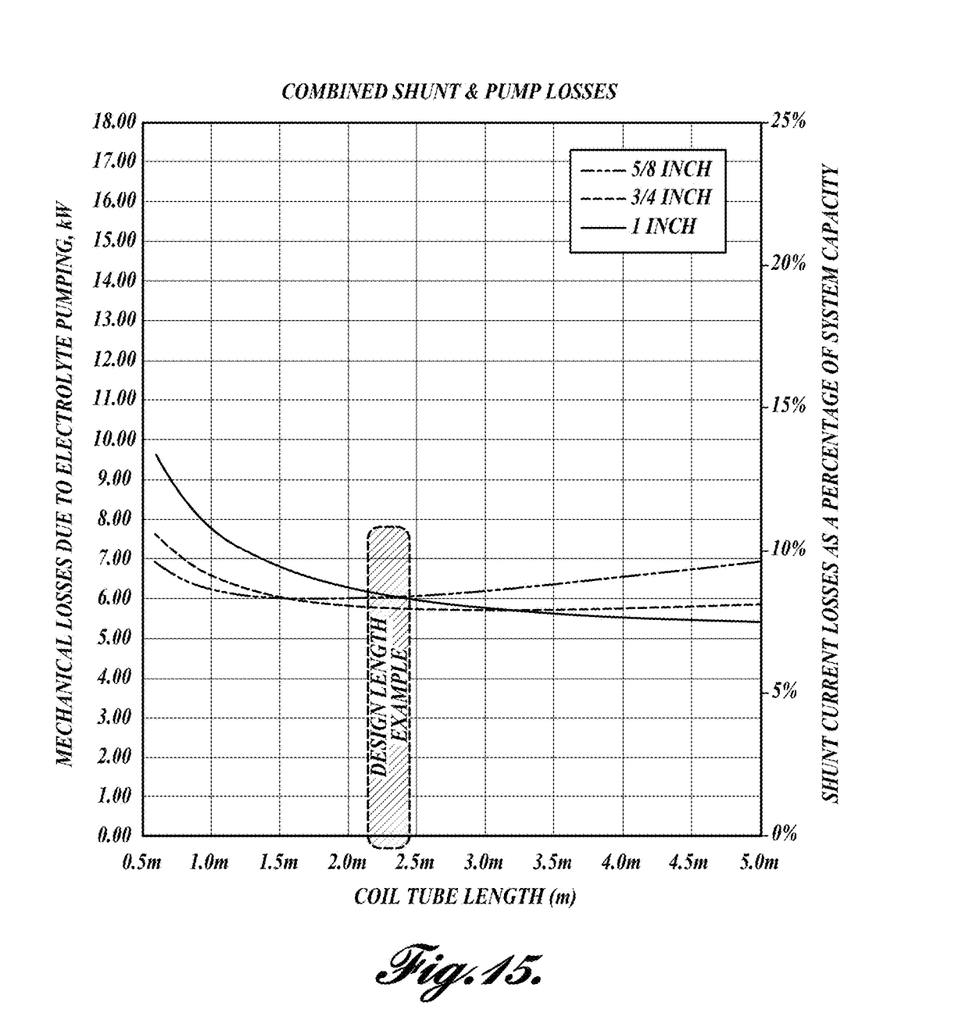
FIG. 15 is a graphical representation of the calculated relationship between combined shunt and pump losses for various shunt current suppression systems, in accordance with embodiments of the present disclosure.

The performance of comparative designs considering combined shunt and pump losses imparted by the design are graphically illustrated for an exemplary system in FIG. 15, wherein the shunt current suppression tubing conduit has a circular cross section with varying diameters and lengths and the electrolyte flow rate is fixed. In one embodiment of the present disclosure, the mechanical losses imparted by the shunt current suppression device are less than the resulting reduction in shunt current losses. In another embodiment of the present disclosure, the mechanical losses imparted by the shunt current suppression devices are greater than the resulting reduction in shunt current losses.

In the illustrated embodiment of FIGS. 1-3, electrically conductive pathways between the first and second electrochemical cells 26 and 28 are formed by fluid flow through conduits 30, as will be described in greater detail below. As can be seen in FIGS. 1 and 2, multiple shunt current suppression devices 32 are positioned along portions of electrically conductive pathways 70 through conduits 30 in the system 20. Although shown as multiple shunt current suppression devices 32 in the illustrated embodiment, in accordance with other embodiments of the present disclosure, a single shunt current suppression device in the system may help to mitigate shunt currents in the system 20. As will be described in greater detail below, exemplary designs for the shunt current suppression devices 32 are provided in FIGS. 4-11.

In the illustrated embodiment, the first cell 26 is arranged in a common housing 60 with cell 27 to form cell stack 36, and the second cell 28 is arranged in a common housing 60 with cell 29 to form cell stack 38. Cell stacks 36 and 38 are electrically connected in series and fluidly connected in parallel (as seen in the schematic of FIG. 2). It should be appreciated, however, that the cell stacks may each include an arrangement of more than two cells connected electrically in series, with single or multiple parallel fluid connections for electrolyte flow in and out of each cell or cell stack. As illustrated in FIG. 2, shunt current suppression devices in accordance with embodiments of the present disclosure may be positioned in fluidic connections between stacks in a system. In accordance with other embodiments, they may also be suitably positioned in a single stack in the fluidic connections between individual cells in the stack.

The system 20 may include more cells or cells stacks than those illustrated and described above. As a non-limiting example, the system 20 may include a third stack, for example including cells 34 and 35. In another non-limiting example, the system 20 may include more than three cell stacks. The stacks may be in fluid communication with each other in series or in parallel. Therefore, it should be appreciated that embodiments of the present disclosure include any number of stacks in a system and any number of cells in a stack, including a single cell stack.

As non-limiting examples, the system 20 may include a single stack having up to 150 cells in the stack. As other non-limiting examples, the system 20 may include up to 75 stacks with 2 cells each, or 6 stacks with 25 cells each.

The fluid pathways between cell stacks 36 and 38 will now be described with reference to FIGS. 1 and 2. As can be best seen in the schematic of FIG. 2, each cell stack 36 and 38 includes at least one anolyte inlet 40, anolyte outlet 42, catholyte inlet 44, and catholyte outlet 46. Anolyte fluid is delivered to each anolyte inlet 40 from the anolyte tank 22, and fluid from each anolyte outlet 42 is delivered back to the anolyte tank 22. Likewise, catholyte fluid is delivered to each catholyte inlet 44 from the catholyte tank 24, and fluid from each catholyte outlet 46 is delivered to the catholyte tank 24.

In the illustrated embodiment of FIGS. 1-3, electrolyte fluid is delivered and received through common electrolyte headers or manifolds 50, 52, 54, and 56 before it is delivered to the respective anolyte or catholyte tank 22 or 24 or to the electrochemical cells 26 and 28 or to the cell stacks 36 and 38. In that regard, the anolyte inlets 40 receive anolyte fluid from anolyte inlet header 50, and the anolyte outlets 42 deliver anolyte fluid to the anolyte outlet header 52. Likewise, the catholyte inlets 44 receive catholyte fluid from catholyte inlet header 54, and the catholyte outlets 46 deliver catholyte fluids to the catholyte outlet header 56. Therefore, these common headers 50, 52, 54, and 56 provide four different conductive pathways between the first and second cells 26 and 28 and between the cell stacks 36 and 38.

Figure 12:
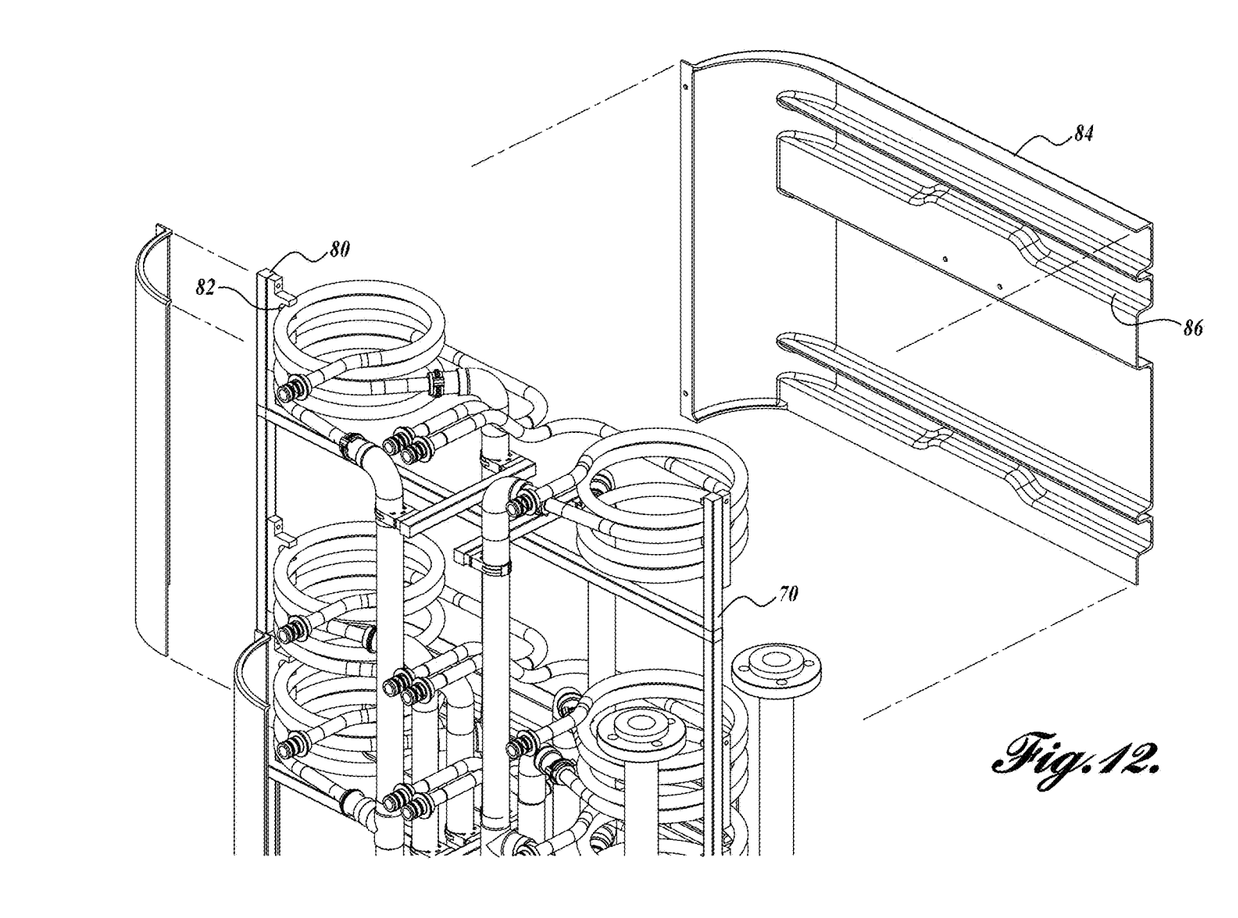
FIGS. 12 and 13 are comparative system configurations showing fluid flow in series and in parallel, respectively, to the anolyte and catholyte tanks, in accordance with other embodiments of the present disclosure.
Figure 13:
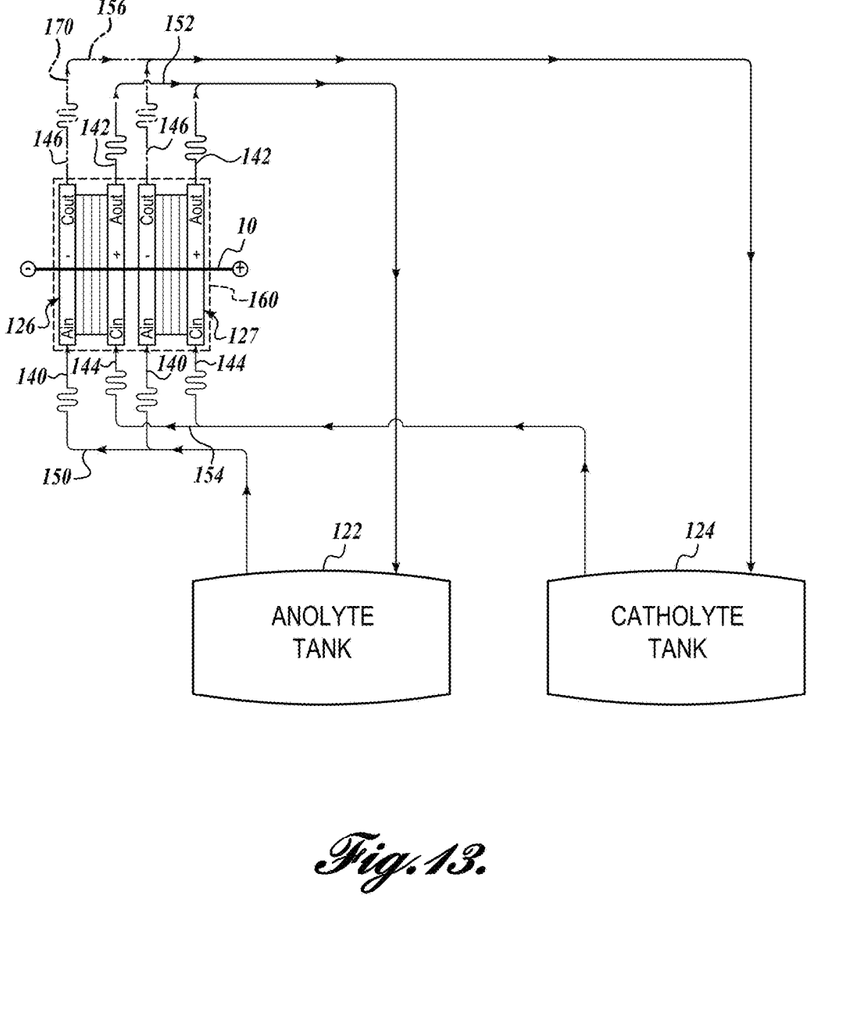

Referring to the simplified comparative drawings of FIGS. 12 and 13, it should be appreciated that common headers are not necessary in the system, and delivery and return of the electrolytes may flow directly between the electrolyte tanks and the cells. In FIG. 12, electrolyte flows to and from anolyte and catholyte tanks 122 and 124 through common headers 150, 152, 154, and 156 to and from the cells 126 and 128. In contrast, in FIG. 13, electrolyte flows through individual conduits directly to and from anolyte and catholyte tanks 222 and 224 to and from the cells 226 and 228. Although the travel paths are different, shunt current travel paths may exist along the electrically conductive fluid pathways between cells 126 and 128 in FIG. 12 and cells 226 and 228 in FIG. 13, as indicated by exemplary dashed lines 170 and 270 showing the travel path for "catholyte out" fluid. Similar electrically conductive fluid shunt current pathways may also be present for anolyte inlet, catholyte inlet, and anolyte outlet lines.

As mentioned above, shunt currents can be reduced by increasing electrical resistance in the fluid pathways of the conductive electrolyte. For example, electrical resistance may be increased by increasing the length of the fluid pathway. Accordingly, embodiments of the present disclosure are directed to increasing the length of the fluid pathways by using elongated electrolyte conduits, for example, arranged in a looping pattern to add length in a compact space. As can be seen in FIG. 2, an exemplary fluid pathway between the catholyte outlet 46 in the first cell 26 and the catholyte outlet 46 in the second cell 28 (as indicated by highlighted fluid path 70) has increased conduit length because of the presence of two shunt current suppression devices 32, shown as sections of elongated conduit in looping patterns (see FIG. 1). (Similar electrically conductive fluid pathways may also be present for anolyte inlet, catholyte inlet, and anolyte outlet lines.)

In the illustrated embodiment, the shunt current suppression devices 32 are located along the fluid path adjacent the respective catholyte outlets 46 of the first and second cell stacks 36 and 38. However, it should be appreciated that the shunt current suppression devices 32 may be positioned anywhere along the fluid path to increase conduit length and reduce shunt currents. In the system 20 shown in FIG. 1, adjacent positioning helps to optimize the dimensions of the system 20. Similar shunt current suppression devices 32 are located in the pathways between fluidly connected anolyte inlet, catholyte inlet, and anolyte outlet lines.

Referring to the illustrated embodiment of FIG. 1, a looping shunt current suppression device 32 in accordance with embodiments of the present disclosure may include one or more loops. In the illustrated embodiment, the looping pattern crosses itself to define at least one complete turn or winding when viewed in a top down view. In one embodiment of the present disclosure, the shunt current suppression device defines a closed shape by crossing itself when viewed in a top down view. In some embodiments, such as the illustrated embodiment of FIG. 1, each shunt current suppression device 32 includes a looping pattern having at least two loops.

Figure 10:
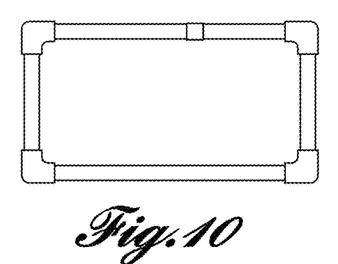
Figure 11:
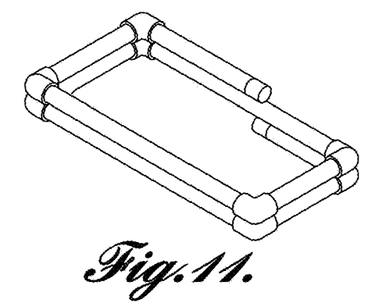

The shape of the loop when viewed in a top view may form a closed shape and may be of one or many different shapes. In the illustrated embodiment of FIG. 1, the shape of the loops is a substantially circular shape in a substantially helical looping pattern (see FIGS. 4 and 5). However, it should be appreciated that other types of looping shapes and looping patterns are also within the scope of the present disclosure, for example, loops may be configured in other shapes, such as substantially oval, substantially rectangular, substantially rectangular with rounded ends, and/or substantially elliptical (see non-limiting examples of alternative loop designs in FIGS. 6-11). As can be seen in FIGS. 10 and 11 a substantially rectangular loops are provided with fittings at corners. It should be appreciated that the corners may also be mitred corners or other concerns known in the art. Although successive loops are shown to be coaxially aligned when viewed from the top planar view, it should be appreciated that successive loops in a shunt current suppression device may also be offset as viewed from the top planar view.

Also, in accordance with embodiments of the present disclosure, there may be multiple loops with no pattern to the looping. In that regard, each loop may be of a different shape. In one embodiment of the present disclosure, the loop may have a curved outer surface, with either a constant or variable radius of curvature. In another embodiment, the loop may have corners and elbows and no radius of curvature along the outer perimeter. It should be appreciated, however, that a design with elbows or corner fittings may increase the mechanical pumping losses of the fluid flow, as compared to a curved design.

In addition to imparting electrical resistance in the conductive fluid pathways, the loop may also be designed to minimize increases to mechanical flow resistance in these same fluid pathways. As mentioned above, mechanical flow resistance is calculated based on many factors and can increase as the result of, for example, the diameter of the conduit, the length of the conduit, the material and roughness of the conduit, connecting welds, and any fittings such as connectors or elbows in the conduit. In some embodiments, the shunt current suppression devices are continuous conduits. In that regard, the shunt current suppression devices may be comprised of continuous tubing between connection ends. In some embodiments, the shunt current suppression devices may have minimal fittings, such as elbow fittings, along their fluid travel path to minimize additional mechanical resistance in the fluid flow path caused by such fittings. In some embodiments, the shunt current suppression devices may not be continuous, but may include welds or joiners that are designed to minimize mechanical resistance in the fluid flow path. In other embodiments, the shunt current suppression devices have fittings, for example, at junctions or connection ends, but such fittings may be designed for minimized mechanical resistance in a fluid flow path. A reduced number of fittings not only reduces mechanical flow resistance in the conduit, but also reduces potential leak points in the conduit.

Each shunt current suppression device includes one or more selected tube cross sections, length, and loop configuration to impart the desired relationship between added electrical resistance for shunt current mitigation and associated mechanical losses. For example, the conduit diameter of the shunt current suppression device may be, as non-limiting examples, tubing of ½", ⅝", or ¾" diameter. As shown in the graphical representation of data in FIG. 15, calculations to determine shunt current losses and mechanical pumping losses can be performed to aid in the design of a suitable shunt current suppression device for a particular system, as described in greater detail below.

Shunt current suppression devices 32 are also designed for ease of assembly, and to reduce fatigue failure. In some embodiments of the present disclosure, the current suppression devices are made from a resilient and flexible material. Resilience and flexibility in the material may allow the looping shunt current suppression devices to provide a mechanical spring action that reduces mechanical fatigue cracking caused by thermal and fluidic cycling, as well as by stresses caused from transporting the system 20 from one location to another. Such flexibility and resilience may also allow ease of assembly in connecting the conduits to the cells stacks 36 and 38 shown in FIG. 1, particularly in compact spaces.

Non-limiting examples of suitable materials for the shunt current suppression devices may include, but are not limited to, cross-linked polyethylene (PEX), high density polyethylene (HDPE), polypropylene (PP), polytetrafluoroethylene (PTFE also known as TEFLON), polyvinylchloride (PVC), or polyvinylidene fluoride (PVDF also known as KYNAR), for example.

In some embodiments, the shunt current suppression devices are formed from a flexible material into a shaped pattern, then annealed after being formed to help the material maintain its intended shape or to impart some rigidity to the material. In other embodiments, the shunt current suppression devices are made from rigid or semi-rigid materials.

Regarding fatigue failure, even if a rigid or semi-rigid material, such as CPVC, is used for the looping shunt current suppression devices, the looping configuration can still contribute to reducing fatigue failure. In that regard, because there is very little lateral support in a looping system, a certain level of flexibility is imparted by the looping structure, even if constructed from a rigid or semi-rigid material. Moreover, a rigid shunt current suppression device with a radius of curvature and a single loop may also have reduced fatigue failure because of the absence of any joints or couplings and therefore, the absence of any strain on such joints or couplings.

Regarding assembly, a certain amount of flexibility may be desirable, for example, to lower the dimensional tolerance requirement for assembly components. Also, flexibility may minimize the time required to assemble components.

Referring to the illustrated embodiment of FIG. 1, in addition to mitigating shunt currents by extending the length of the electrolyte flow pathways, the shunt current suppression devices 32 are also configured to be used in a compact design. In that regard, multiple shunt current suppression devices 32 may be used in a compact space to impart suitable fluid flow path length without out increasing the housing requirements for the overall system 20. Therefore, the looping shunt current suppression devices 32 allow for significantly increasing the flow path distance between the stacks 36 and 38 in a compact way by simply adding one or more turns (loops) to the looping pattern or by increasing the diameter of the turns (loops). By appropriately selecting the length and diameter of the shunt current suppression devices 32, shunt current efficiency losses may be balanced against conduit flow losses, thereby allowing better system optimization.

Referring to FIG. 1, the electrolyte headers 50, 52, 54, 56 and the shunt current suppressions devices 32 are configured for fluid flow to be in a substantially downward flow pattern, which facilitates draining of electrolyte as may be necessary during system operation. To support this downward flow, the shunt current suppression system may include a support frame 80 to enable spacing between the loops of flexible tubing and to maintain the substantially downward flow path.

Figure 14:
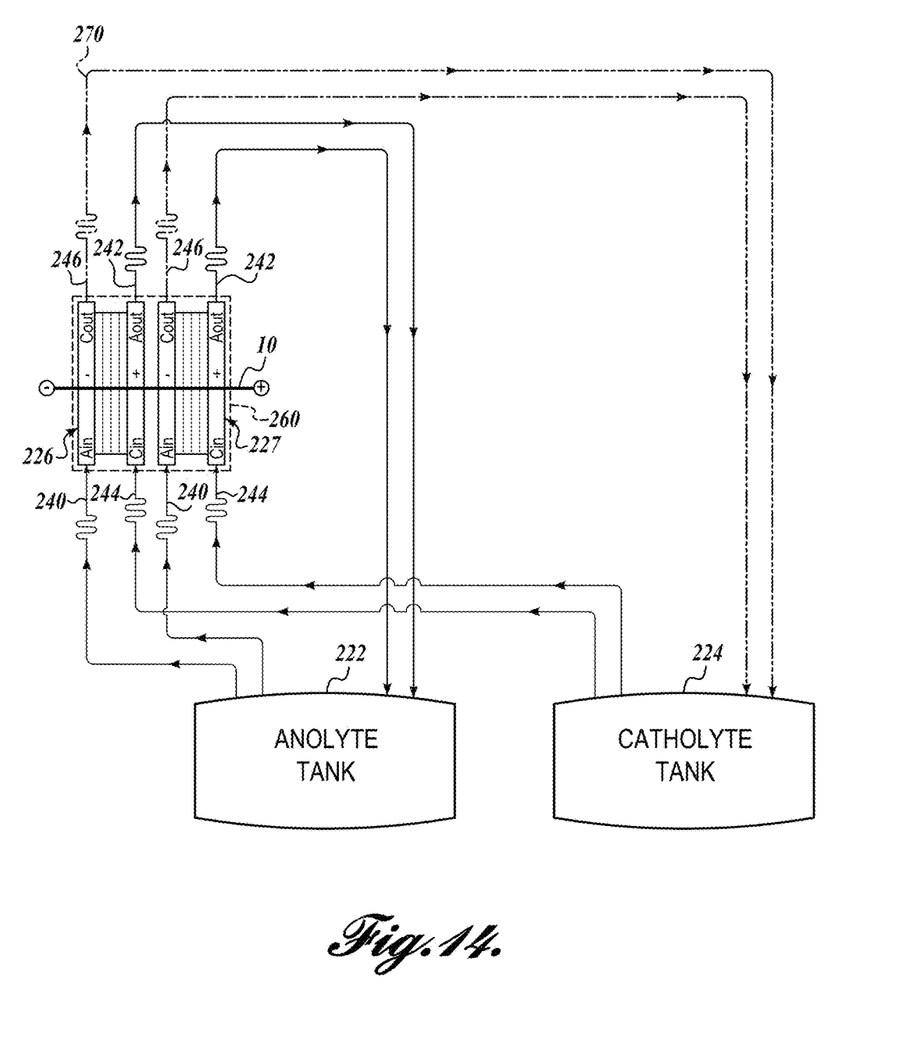
FIG. 14 is an exploded view of a cover assembly in the flowing electrolyte electrochemical system of FIG. 1.

As can be seen in FIGS. 1 and 14, the support frame 80 is a substantially vertically extending frame having a plurality of notches 82 for receiving and supporting a loop of a shunt current suppressions device 32.

In addition to the support frame 80, the system 20 in the illustrated embodiment of FIG. 1 further includes protective covers 84 for the shunt current suppression devices 32. As seen in the exploded view of FIG. 14, the internal surface of the covers 84 may also include grooves 86 defining an additional support frame for supporting the shunt current suppression devices 32.

EXAMPLE

Mechanical and Electrical Resistance

Data provided in FIG. 15 represents theoretical use of the exemplary system 20 illustrated in FIG. 1, where the loops viewed from a top planar view are substantially circular, and the shape of the loops is generally helical. In this embodiment, the diameter of the loops, the electrolyte flow rate, and electrolyte physical characteristics such as viscosity and conductivity are fixed, and the circular cross section and the length (number of loops) are allowed to vary.

One method of calculation for mechanical pumping losses and shunt current losses associated with the loops is described below. It should be appreciated that alternate testing and analytical methods may also be used to obtain such results.

Pumping Loss Calculations

The friction factor is first calculated, followed by calculations for pressure drop. Friction factor calculation variables are defined as follows:
D: Pipe Internal Diameter
R: Radius of coil helix (measured from axis to pipe centerline)
De: Dean number
$Re_e$: Transitional Reynolds number for a coil
$f_e$: Friction factor for a coil of smooth pipe
$f_{rough}$: Friction factor for rough pipe
$f_{smooth}$: Friction factor for smooth pipe For single-phase flow in a coil, a secondary flow pattern that changes fluid behavior is established in the pipe that stabilizes fluid flow, increasing the Reynolds number at which the flow enters the transition from laminar to turbulent flow. A Reynolds number correction is shown.

$$Re_c = 2100\left(1 + 12\sqrt{\frac{D}{R}}\right)$$

Here R is the radius of the coil helix, taken from the center of the pipe.

Below this calculated Reynolds number the fluid flow is laminar, and above this calculated Reynolds number the fluid is in transition or turbulent flow. Using the corrected Reynolds number, a Darcy friction factor for flow in coils is estimated for the purpose of calculating the pressure drop:

To determine the friction factor in the coil the Dean number (De) is required:

$$De = Re\sqrt{\frac{D}{R}}$$

The friction factor for flow in a coil of smooth pipe can then be calculated as follows:

for $De < 11.6$ $$f_c = \frac{64}{Re}$$

for $11.6 < De < 2000$ $$f_c = \frac{65/Re}{1 - \left[1 - \left(\frac{11.6}{De}\right)^{0.45}\right]^{3.2}}$$

for $De > 2000$ $$f_c = \frac{7.0144}{Re}\sqrt{De}$$

For fully turbulent flow in smooth coils the correlation below may be used:

$$f_c = 0.336\left(\frac{D}{R}\right)^{0.1} Re^{-0.2}$$

This equation immediately above is applicable in the ranges:

$$Re\left(\frac{D}{R}\right)^2 < 700$$

$$0.0097 < \frac{D}{R} < 0.135$$

To account for the effect of roughness the following correction may be employed:

$f_{c,rough} = f_c f_r$

Where $f_r$ represents the ratio of friction factors for smooth pipe and rough pipe for the inside diameter of the pipe making up the coil:

$f_r = f_{rough} f_{smooth}$

The following formula may be used to calculate pressure drop in the helical coil:

$\Delta p = f_{c,rough}(l/d_h)(\rho v^2/2)$

Where:
$\Delta p$=pressure drop
$f_{c,rough}$=Coil rough friction
l=length of pipe in the coil
$d_h$=pipe inside diameter
$\rho$=electrolyte density
v=flow velocity With a known pressure drop ($\Delta p$), electrolyte flow rate (Q), and pump efficiency, the mechanical pumping losses Wp, included in FIG. 15 as kilowatts, can be calculated as follows:

$Wp=(\Delta p)(Q)$ (pump efficiency)

Shunt Current Loss Reduction Calculations

Shunt current magnitude calculations are based on Ohm's Law, I=V/R, where:
I=shunt current
V=voltage gradient that induces shunt current flow
R=resistance to current flow in ionically conductive fluid pathways as determined by pipe diameter and length, and electrolyte conductivity. Shunt current losses Ws, included in FIG. 15 as kilowatts can also be calculated according to Ohm's Law, W=(V)(I), where:
Ws=power in kilowatts
V=voltage gradient that induces shunt current flow
I=shunt current

Combined Shunt and Pump Losses

As illustrated in FIG. 15, the combined effect of shunt current mitigation and associated mechanical pumping losses, Ws+Wp, summed for all loops comprising shunt current suppression devices 32 in the system 20 of FIG. 1 are expressed as a percentage of the overall system capacity for different coil lengths and tube diameters. In one embodiment of the present disclosure, the desired coil tube length for this example is approximately 2.3 meters, and at this length, it can be observed that a ¾" pipe provides the most practical combination length, high shunt current loss mitigation, low associated mechanical losses, and a range of acceptable length variation.

Using any combination of analytical and empirical methods, it can be seen that shunt current suppression devices can be designed to improve system performance while minimizing associated mechanical losses.

Referring now to FIGS. 1 and 16-18, connector assemblies 90 for connecting conduits 30 within the system 20 will now be described in greater detail. The connector assemblies 90 are designed and configured for mitigating mechanical pumping losses, and provide the added benefit of ease of assembly and replacement. It should be appreciated that the connector assemblies 90 provide advantages to the system 20 whether used in conjunction with or without shunt current suppression devices 32 in the system 20. Therefore, embodiments of the present disclosure include systems 20 including connector assemblies 90 or shunt current suppression devices 32, or both.

Figures 16, 17, 18:
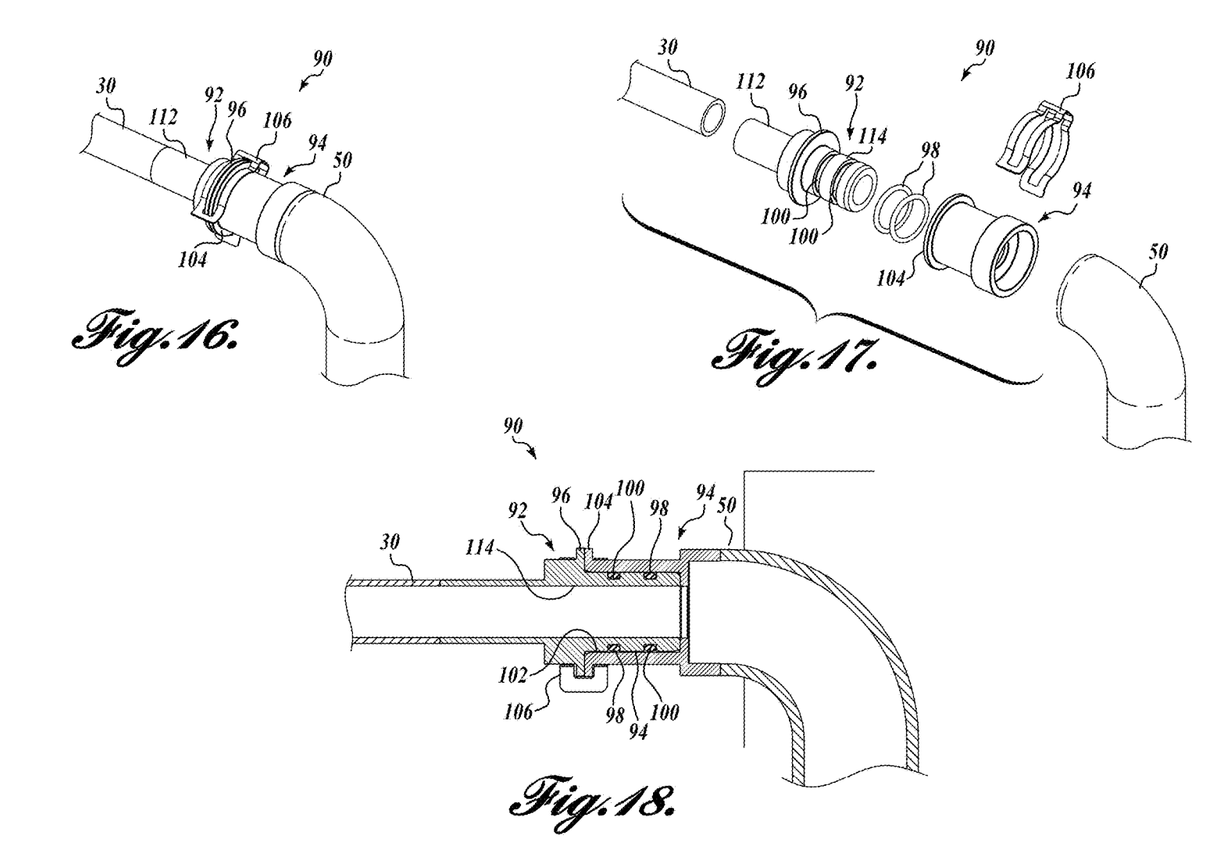
FIGS. 16-18 are directed to connector assemblies for connecting conduits within the system of FIG. 1.

Referring to FIGS. 16-18, a connector assembly 90 in accordance with embodiments of the present disclosure includes a first connector portion 92 and a second connector portion 94. First connector portion 92 is attachable to the end of a conduit 30 and is configured to be received within second connector portion 94 on cell stack 26. The connector portions 92 and 94 allow for connection between the conduit 30 and a header, e.g., header 50, or a cell or cell stack, e.g., cell 26, or a tank 22 or 24. The design of the connector portions 92 and 94 provide a fluid pathway that minimizes mechanical resistance and mechanical pumping losses.

Referring to FIG. 17, first connector portion 92 includes a first flange 96 and an extension portion 114. Extension portion 114 includes a sealing assembly 98 for forming a seal when the extension portion 114 of the first connector portion 92 is received by the second connector portion 94. In the illustrated embodiment, sealing assembly 98 is shown as two O-ring seals received in grooves 100 located on the outer perimeter of extension portion 112. However, it should be appreciated that the sealing assembly 98 needs not include two O-ring seals, and may include only one or more than two. In addition, other known sealing assemblies or sealing techniques are within the scope of the present disclosure.

Referring to FIG. 18, the second connector portion 94 includes a receiving portion 102 and a second flange 104 extending from the outer perimeter of the receiving portion 102. Although shown in the illustrated embodiment as the first connector portion 92 being a male mating portion and second connector portion 94 being a female mating portion, it should be appreciated that the configuration may be reversed.

When the first and second connector portions 92 and 94 are mated (see FIG. 18), the sealing assembly 98 provides an interference fit between extension section 94 and receiving portion 102. Referring to FIGS. 16 and 17, for secure attachment, a retaining mechanism, such as a clip or clamp 106, can be used to clamp flanges 96 and 104 together in adjacent positioning. The clamp 106 may be a quick release clamp that can be manually clamped and/or released by an operator without the use of tools to allow for ease of assembly and release. It should be appreciated, however, that the clamps or connectors that are of a more permanent type requiring tools for assembly and disassembly are also within the scope of the present disclosure.

Although shown as including first and second flanges 96 and 104, it should be appreciated that the connector assembly 90 may include other features that are capable of connection in adjacent positioning. For example, flanges may be replaced by grooves that would be capable of receiving a retaining mechanism to secure adjacent positioning.

To minimize mechanical losses through the connector assembly 90, the fluid flow path 108 is configured to minimize joints, elbows, or constraint on the fluid. In that regard, the fluid flow path 108 is a substantially straight fluid path through the connector assembly 90.

In addition, a coupling conduit 112 between the connector assembly 90 and the shunt current mitigation device 32 may be designed to further minimize mechanical losses. In the illustrated embodiment, the coupling conduit 112 between the connector assembly 90 and the shunt current mitigation device 32 is a length of tube designed and configured for ease of transition from the connector to the looping shunt current mitigation device without introducing elbows or opportunities for other flow restrictions of the fluid flow path 108.

The various parts of the connector assembly 90 may be constructed from any suitable materials. For example, the first and second portions 92 and 94 may be constructed from materials described above with reference to the shunt current mitigation device. Likewise, the coupling conduit 112 may be constructed from plastic and may be welded to the connector assembly 90 and the shunt current mitigation device 32 using known welding techniques. Alternatively, the coupling conduit 112 may be integrally formed with either of the connector assembly 90 and the shunt current mitigation device 32.

In accordance with some embodiments of the present disclosure, the first and second connector portions 92 and 94 of the connector assembly 90 are designed to be connectable by welding to any suitable pipe or connector, whether standard or custom, that is made from suitable materials for welding. Such connector assemblies may be used in redox flow battery systems or in any other systems for fluid flow.

While illustrative embodiments have been illustrated and described, it will be appreciated that various changes can be made therein without departing from the spirit and scope of the disclosure.

The invention claimed is:

1. A redox flow battery system, comprising:
    (a) an anolyte storage tank for containing a liquid anolyte;
    (b) a catholyte storage tank for containing a liquid catholyte;
    (c) at least first and second stacks of electrochemical cells, each of the first and second stacks of electrochemical cells including a plurality of electrochemical cells;
    (d) a conduit external to the first and second stacks of electrochemical cells providing at least a portion of an electrically conductive fluid pathway between the first and second stacks of electrochemical cells, wherein the conduit includes only one inlet to or one outlet from the first stack of electrochemical cells and only one inlet to or one outlet from the second stack of electrochemical cells, a common manifold configured for liquid anolyte or liquid catholyte flow between the first and second stacks of electrochemical cells, and at least one shunt current suppression device configured as a loop extending between the only one inlet or outlet of at least one of the first and second stacks of electrochemical cells to the common manifold, wherein the loop crosses itself defining at least one full turn and wherein the looping pattern is in a substantially continuously sloped configuration to allow for downward fluid flow.

2. The system of claim 1, wherein the shunt current suppression device includes first and second connections.

3. The system of claim 2, wherein the shunt current suppression device is continuous tubing extending between the first and second connections.

4. The system of claim 2, wherein the shunt current suppression device does not include elbow fittings.

5. The system of claim 1, wherein the shunt current suppression device is made from a flexible material.

6. The system of claim 1, wherein the shunt current suppression device is made from a plastic material that is annealed during the forming process.

7. The system of claim 1, wherein the shunt current suppression device is made from a material selected from the group consisting of polyethylene, polypropylene (PP), polytetrafluoroethylene (PTFE), polyvinylchloride (PVC), and polyvinylidene fluoride (PVDF).

8. The system of claim 1, wherein each of the plurality of loops has a radius of curvature at any point along the length of the loop.

9. The system of claim 1, wherein each of the plurality of loops is configured in a substantially circular shape, substantially oval shape, substantially rectangular shape, substantially rectangular shape with rounded ends, or a substantially elliptical shape.

10. The system of claim 1, further comprising at least a third electrochemical cell.

11. The system of claim 1, wherein the conduit providing an electrically conductive fluid pathway between the first and second stacks of electrochemical cells includes a common manifold for one of catholyte inlets, catholyte outlets, anolyte inlets, and anolyte outlets.

12. The system of claim 1, further comprising a shunt current suppression device for each of catholyte inlets, catholyte outlets, anolyte inlets, and anolyte outlets.

13. The system of claim 1, further comprising a support assembly for supporting the conduit.

14. The system of claim 13, wherein the support assembly includes a support frame.

15. The system of claim 13, wherein the support assembly includes a cover configured to support the conduit.

16. A redox flow system, comprising:
(a) an anolyte storage tank for containing a liquid anolyte;
(b) a catholyte storage tank for containing a liquid catholyte;
(c) at least first and second electrochemical cells;
(d) a conduit providing at least a portion of an electrically conductive fluid pathway between the first and second electrochemical cells, wherein the conduit includes a common manifold between the first and second stacks of electrochemical cells and at least one shunt current suppression device configured as a loop extending from at least one of the first and second electrochemical cells to the common manifold, wherein the loop crosses itself defining at least one full turn; and
(e) a support assembly for supporting the conduit, wherein the support assembly is configured to support flexible tubing in a substantially continuously sloped configuration to allow for downward fluid flow.

17. The system of claim 1, wherein the power saved by shunt current loss reduction is greater than the power used for increased mechanical loss imparted by the shunt current suppression device.

18. A redox flow battery system, comprising:
(a) an anolyte storage tank for containing a liquid anolyte;
(b) a catholyte storage tank for containing a liquid catholyte;
(c) at least first and second electrochemical stacks, wherein the first and second electrochemical cells are stacks of multiple electrochemical cells;
(d) a conduit providing at least a portion of an electrically conductive fluid pathway between the first and second electrochemical stacks, wherein the conduit includes a common manifold between the first and second electrochemical cells and at least one shunt current suppression device configured in a looping pattern extending from at least one of the first and second electrochemical cells to the common manifold, wherein at least one loop crosses itself and wherein the looping pattern is in a substantially continuously sloped configuration to allow for downward fluid flow.

19. A redox flow battery system, comprising:
(a) an anolyte storage tank for containing a liquid anolyte;
(b) a catholyte storage tank for containing a liquid catholyte;
(c) at least first and second electrochemical cells, wherein the first and second electrochemical cells are stacks, wherein each stack includes a plurality of single electrochemical cells;
(d) a conduit providing at least a portion of an electrically conductive fluid pathway between the first and second electrochemical cells, wherein the conduit includes a common manifold configured for liquid anolyte or liquid catholyte flow between the first and second electrochemical cells and first and second shunt current suppression devices connected to each of the first and second electrochemical stacks, each of the first and second shunt current suppression devices configured as a looping pattern extending between a single exit or entry connection to each of the first and second electrochemical stacks and the common manifold, wherein at least one loop crosses itself defining at least one full turn and wherein the looping pattern is in a substantially continuously sloped configuration to allow for downward fluid flow.

20. A redox flow battery system, comprising:
(a) at least first and second stacks of electrochemical cells, each of the first and second stacks of electrochemical cells including a plurality of electrochemical cells including an electrolyte; and
(b) an electrolyte conduit external to the first and second stacks of electrochemical cells providing at least a portion of an electrically conductive pathway between the first and second stacks of electrochemical cells, wherein the conduit includes only one inlet to or one outlet from the first stack of electrochemical cells and only one inlet to or one outlet from the second stack of electrochemical cells, and at least one shunt current suppression device in the electrolyte conduit configured as a loop, wherein the loop crosses itself defining at least one full turn and wherein the looping pattern is in a substantially continuously sloped configuration to allow for downward fluid flow.

* * * * *